United States Patent
Duan et al.

(10) Patent No.: US 8,155,166 B2
(45) Date of Patent: Apr. 10, 2012

(54) REDUCING INTER-CARRIER-INTERFERENCE IN OFDM NETWORKS

(75) Inventors: Chunjie Duan, Medfield, MA (US); Weihua Gao, Syracuse, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 363 days.

(21) Appl. No.: 12/571,191

(22) Filed: Sep. 30, 2009

(65) Prior Publication Data

US 2011/0075707 A1    Mar. 31, 2011

(51) Int. Cl.
*H04B 1/00*       (2006.01)
(52) U.S. Cl. ........................ 375/130; 370/206
(58) Field of Classification Search ............... 375/130, 375/296, 285, 299, 267, 347, 259; 370/203, 370/206, 208
See application file for complete search history.

(56) References Cited

U.S. PATENT DOCUMENTS

| | | | |
|---|---|---|---|
| 6,804,307 B1* | 10/2004 | Popovic | 375/299 |
| 7,680,211 B1* | 3/2010 | von der Embse | 375/299 |
| 7,773,685 B2* | 8/2010 | Tirkkonen et al. | 375/267 |
| 2002/0122465 A1* | 9/2002 | Agee et al. | 375/141 |
| 2004/0081074 A1* | 4/2004 | Piechocki | 370/206 |
| 2006/0034163 A1* | 2/2006 | Gore et al. | 370/208 |

* cited by examiner

*Primary Examiner* — Jean B Corrielus
(74) *Attorney, Agent, or Firm* — Dirk Brinkman; Gene Vinokur

(57) ABSTRACT

Embodiments of the invention disclose a system and a method for reducing inter-carrier interference (ICI) in a network, wherein the network uses orthogonal frequency division multiplexing (OFDM). The method generates, in a transmitter, a diversified signal, wherein a diversified signal includes diversified elements representing data elements, such that each data element is represented by a number of diversified elements, wherein the number equals a degree of diversity. The diversified signal is modified based on an orthogonal matrix producing a spread signal, wherein columns of the orthogonal matrix are formed by vectors, wherein the vectors are orthogonal or quasi-orthogonal to each others, and the spread signal is transmitted in the network.

17 Claims, 9 Drawing Sheets

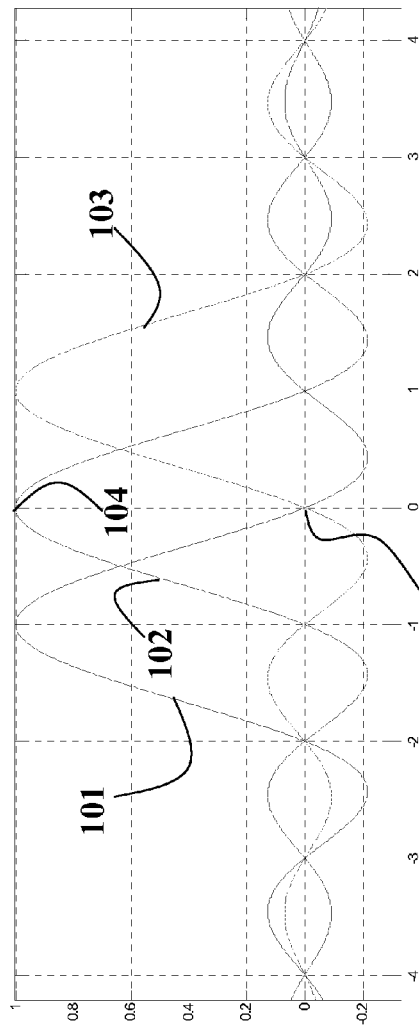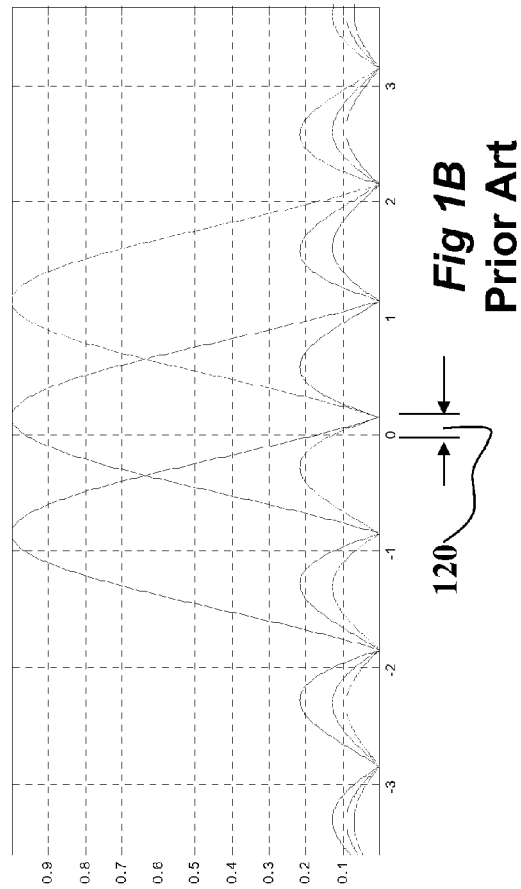
*Fig 1A Prior Art*
*Fig 1B Prior Art*

300

REDUCING INTER-CARRIER-INTERFERENCE IN OFDM NETWORKS

FIELD OF INVENTION

The present invention relates generally to wireless communications networks, and more particularly to reducing inter-carrier-interference in wireless networks.

BACKGROUND OF THE INVENTION

In communication networks that use orthogonal frequency division multiplexing (OFDM), the bandwidth is partitioned into multiple subcarriers. Similarly, multiple transceivers can share the same transmission bandwidth using networks with orthogonal frequency-division multiple-access (OFDMA). OFDMA, also partitions the bandwidth into subcarriers, and transceive data concurrently using non-overlapping subsets of the subcarriers.

OFDM and OFDMA networks offer high spectrum efficiency and low complexity implementation and are used in networks designed according to numerous wireless standards, such as IEEE 802.11, IEEE 802.16 and 3GPP-LTE. In OFDM and OFDMA networks, the bandwidth available for communications is a set of N parallel channels or subcarriers. As defined herein, a carrier or a subcarrier is a frequency which carries analog or digital signal. A single OFDM symbol includes multiple subcarriers and each subcarrier carries data, which is represented as modulation alphabet based on a digital modulation scheme, such as quadrature amplitude modulation or phase-shift keying.

In ideal conditions, the subcarriers remain orthogonal to each other in the frequency domain within the received signal, i.e., the energy of one subcarrier is not present in the received signal for another subcarrier.

However, frequency orthogonality is often destroyed by Doppler frequency shift and carrier frequency offset (CFO) between of the transmitter and the receiver. In such cases, the signal from one subcarrier interferes with the signal of other subcarriers as inter-carrier interference (ICI).

FIG. 1A shows an energy distribution of subcarriers, i.e., $SC_{-1}$ 101, $SC_0$ 102 and $SC_{+1}$ 103 as a function of frequency, normalized to the subcarrier spacing when CFO is absent. The energy of the subcarrier $SC_0$ reaches a maximum 104 at frequency $f_0$. The energy 105 of the signals of subcarriers $SC_{-1}$ and $SC_{+1}$ at the frequency $f_0$ is zero because the frequencies are orthogonal.

FIG. 1B shows the energy distribution of subcarriers subject to the CFO 120. The energy of subcarrier $SC_{-1}$ and $SC_{+1}$ at frequency $f_0$ are non-zero. That is, the energy from the subcarriers $SC_{-1}$ and $SC_{+1}$ becomes interference to subcarrier $SC_0$.

The ICI can be quantified by the ratio of the received energy from the subcarrier to the total energy from all other subcarriers, i.e., the carrier-to-interference ration (CIR). The CIR decreases as the CFO increases. ICI can increase the bit-error-rate (BER), and in severe cases make the network inoperable.

ICI Reduction

The effect of ICI can be reduced using a number of conventional methods, such as frequency domain equalization (FDE), transmit signal windowing, and self-canceling ICI.

The FDE-based method estimates the CFO. Then, a matrix is constructed using the estimated CFO. Applying the matrix to the received signal in the time domain reduces the ICI. However, the CFO compensation requires an accurate estimate of the CFO, which increases noise and complexity of the receiver. The computation complexity of the matrix is high.

The transmit signal windowing performs oversampling of the received signal in the frequency domain. The oversampled signal is filtered in the time domain by a low-pass filter, such as Hanning window.

The self-cancelling scheme maps each transmit data symbol to an adjacent pair of subcarriers with opposite polarity, such that $\alpha_{2k} = -\alpha_{2k+1}$ where $\alpha_{2k}$ is the data on the $2k^{th}$ subcarrier. The interference to the $m^{th}$ subcarrier, ($m \neq 2k$ or $2k+1$), from $2k^{th}$ and $(2k+1)^{st}$ subcarrier partially cancels each other.

OFDM/OFDMA Transmitter and Receiver

FIG. 2 shows a conventional OFDM transmitter 200 and OFDM receiver 250 with built-in frequency diversity communicating a signal 230 via a wireless channel h 299. The received signal 251 includes noise n(t) 298.

In the transmitter 200, input data (symbols) 205 are partitioned into blocks A 201 by a serial to parallel (S/P) module 225. Each block A is a vector of length M and each element $a_m$ of the vector is a complex number having values determined by the input data and a modulation format.

An interleaved diversity module 221 adds frequency diversity by generating a interleaved diversified block B 202 including elements $b_{m,k}$ based on the block A 201. For example, the diversity module repeats the block A K times to produce the interleaved diversified block B. A mapping module 222 performs tone mapping, pilot and guard band null tone insertion to produce N-point frequency domain symbols S 203. The symbols S are converted to time domain OFDM symbols s 204 using an N-point inverse discrete Fourier transformation (IDFT) 223. The OFDM symbols s are ordered serially 224 by a parallel-to-serial module. A cyclic prefix (CP) is appended to produce a baseband signal s'(t) 206. The baseband signal is up-converted 207 to the radio frequency (RF) signal $s_{RF}(t)$ 230 and transmitted over the channel 299.

The received signal $r_{RF}(t)$ 251 is down-converted and discretized to a discrete baseband signal $r_{BB}(t)$ 256. A serial to parallel module 271 removes the cyclic prefix from the signal $r_{BB}(t)$ producing a signal r(t) 252, which in turn is converted by a DFT block 272 to frequency-domain symbols R 253. A demapping module 273 removes non-data tones and passes data symbols Y 254 to a subcarrier combining module 274. The module 274 outputs data Z 255, where each element in Z, $Z_m$, is produced based on the combined signal from multiple subcarriers. The output Z 255 is assembled into a continuous output stream 256.

The transmitter and receiver provide improved performance due to the frequency diversity. However, the transmitter and receiver do not improve the performance with respect to carrier frequency offset (CFO).

Accordingly, it is desired to improve the performance of OFDM/OFDMA networks performance under CFO.

SUMMARY OF THE INVENTION

The embodiments of the invention are based on the realization that inter-carrier interference (ICI) in a signal transmitted in orthogonal frequency division multiplexing (OFDM) network can be reduced by modifying the signal based on an orthogonal matrix producing a spread signal, wherein columns of the orthogonal matrix are formed by vectors, wherein some, or all of the column vectors in the matrix are orthogonal or quasi-orthogonal to each others. The spread signal can be de-spread at the receiver based on the same orthogonal matrix.

One embodiment discloses a method for reducing inter-carrier interference (ICI) in a network, wherein the network uses orthogonal frequency division multiplexing (OFDM), comprising a processor for performing steps of the method, comprising the steps of: generating, in a transmitter, a diversified signal B of M data elements repeated K times; multiplying, in the transmitter, the diversified signal B by an orthogonal matrix C according to B·C to produce a spread signal D suitable for transmission in the network at a reduced ICI, wherein the orthogonal matrix is a M×K matrix, and M columns in the orthogonal matrix correspond to K vectors $\{q_1, q_2, \ldots q_K\}$, wherein the K vectors are orthogonal; and transmitting the spread signal D in the network.

Another embodiment of the invention discloses a method for reducing inter-carrier interference (ICI) in a network, wherein the network uses orthogonal frequency division multiplexing (OFDM). The method generates, in a transmitter, a diversified signal, wherein a diversified signal includes diversified elements representing data elements, such that each data element is represented by a number of diversified elements, wherein the number equals a coefficient of diversification. The diversified signal is modified based on an orthogonal matrix producing a spread signal, wherein columns of the orthogonal matrix are formed by vectors, wherein the vectors are orthogonal or quasi-orthogonal to each others, and the spread signal is transmitted in the network.

Yet another embodiment discloses a system for reducing inter-carrier interference (ICI) in a network, wherein the network uses orthogonal frequency division multiplexing (OFDM), comprising a processor for performing steps of the method, including an interleaved diversity module configured for generating a diversified signal B of M data elements repeated K times; an orthogonal spreading module configured for multiplying, in the transmitter, the diversified signal B by an orthogonal matrix C according to B·C to produce a spread signal D suitable for transmission in the network at a reduced ICI, wherein the orthogonal matrix is a M×K matrix, and M columns in the orthogonal matrix correspond to K vectors $\{q_1, q_2, \ldots q_K\}$, wherein the K vectors are orthogonal; and a transmitting module configured for transmitting the spread signal D in the network.

BRIEF DESCRIPTION OF THE DRAWINGS

FIG. 1A is a graph of subcarrier energy distributions as a function of frequency without carrier frequency offset (CFO);

FIG. 1B is a graph of subcarrier energy distributions as a function of frequency with CFO;

DETAILED DESCRIPTION OF THE PREFERRED EMBODIMENTS

Figure 2:
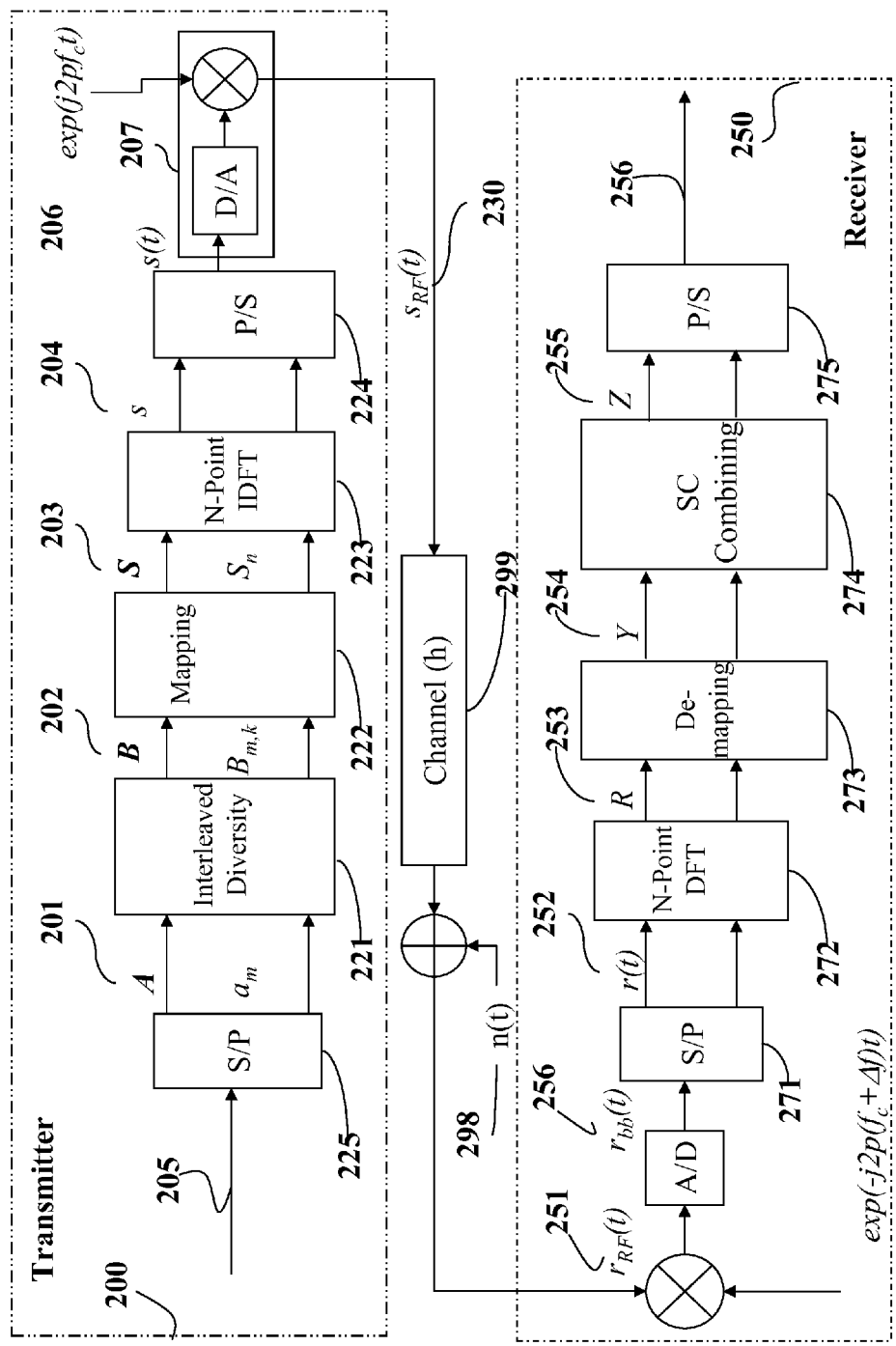
FIG. 2 is a block diagram of a conventional OFDM transmitter and receiver using interleaved subcarrier diversity assignment.
Figure 3:
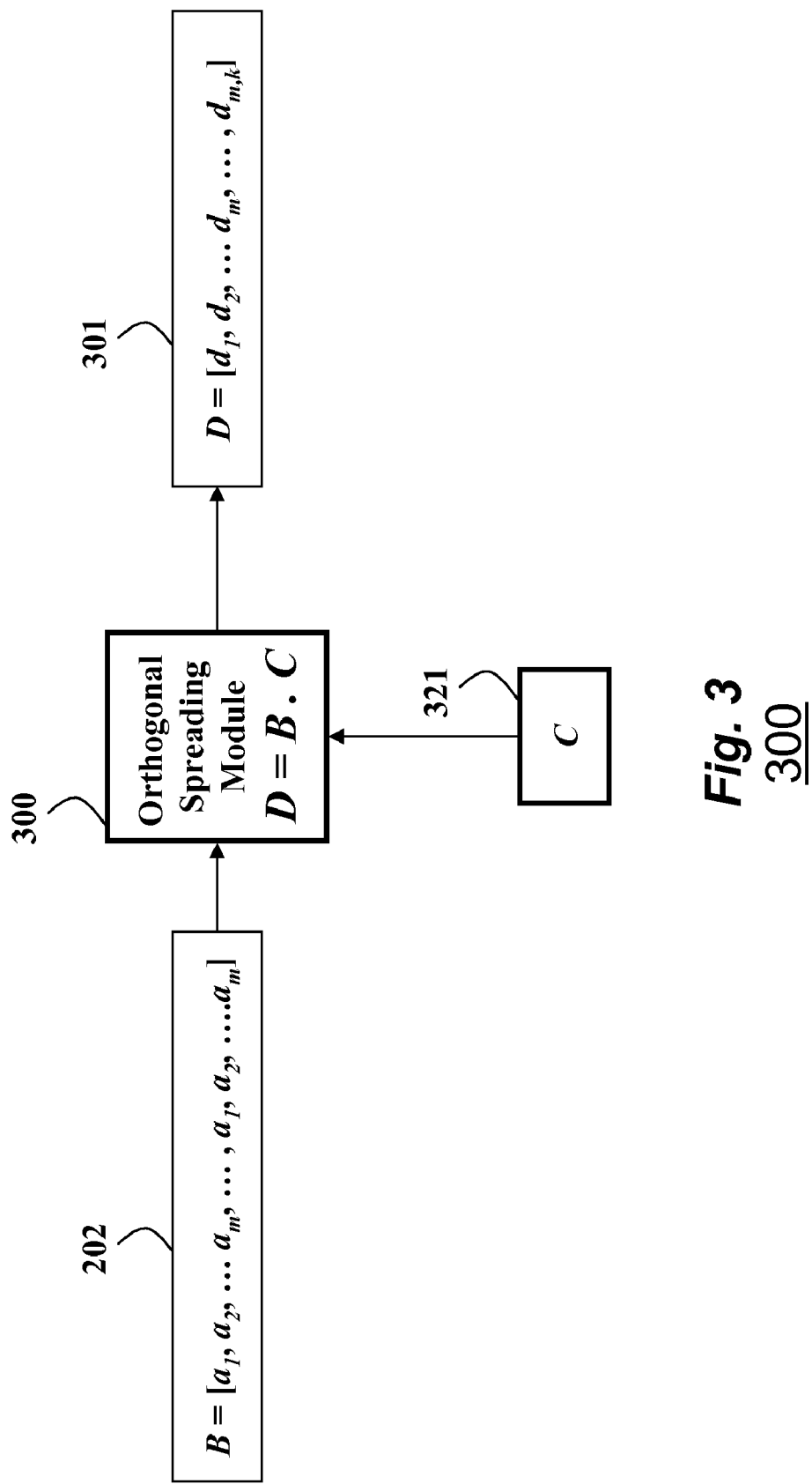
FIG. 3 is a block diagram of a method for transmitting a signal while reducing inter-carrier interference (ICI) according to embodiments of the invention.

FIG. 3 shows an orthogonal spreading module 300 for reducing inter-carrier interference (ICI) in a signal transmitted according to embodiments of our invention. The module can be a processor in a transmitter for performing steps of a method for ICI reduction.

The module 300 takes as input a diversified signal B 203 from the interleaved diversity module 221 and produces as output spread signals D 301 for the mapping and grouping module 222.

Figure 4:
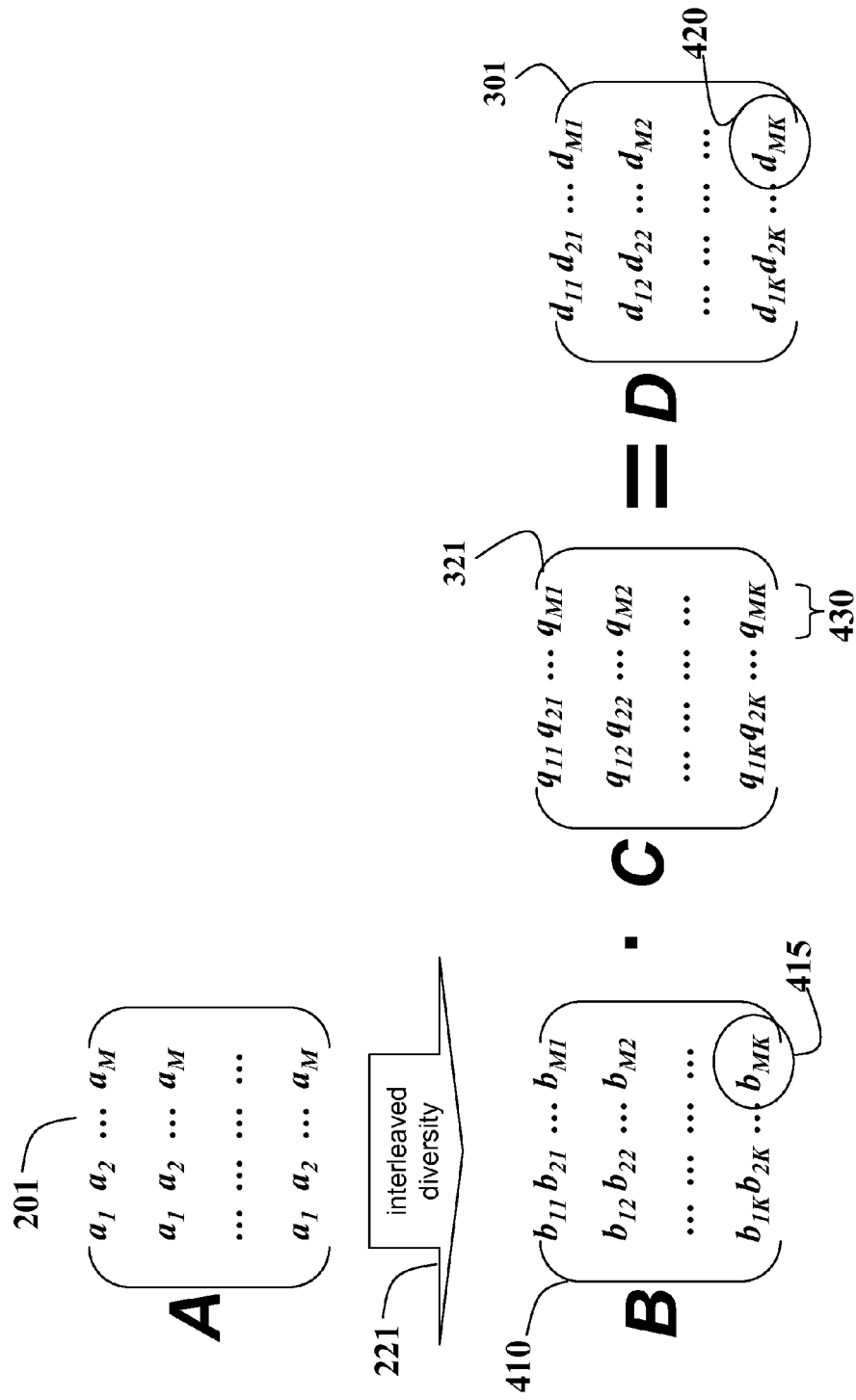
FIG. 4 is a schematic of a spreading operation according to embodiments of an invention.

As shown in FIG. 4, the diversified signal 202 is expressed by a matrix $$B = P \times A = [A^T A^T, \ldots A^T]^T \; 410$$

where P is a column vector of K elements, $P = [1, 1, \ldots, 1]^T$, and T is a transpose operator.

The matrix B is an M×K matrix with diversified elements $b_{m,k}$ 415. The $m^{th}$ column of the matrix B, is a vector of length K $$B^C_m = [b_{1m}, b_{2m}, \ldots b_{km}] = [a_m, a_m, \ldots a_m].$$

The orthogonal spreading module 300 multiplies the diversified signal 202 by an orthogonal matrix C 321 to produce the spread signal 301. The spread signal is a matrix having elements $d_{m,k}$ 420, i.e., $$D = B \cdot C, \text{ or } d_{m,k} = c_{m,k} \cdot b_{m,k} \text{ for } [a \neq b],$$

where · is an inner product operator.

The orthogonal spreading matrix C is an M×K matrix. Each column vectors $C^C_m$ of the orthogonal spreading matrix C is selected from a set of vectors Q 430

$$C^C_m \in Q = \{q_1, q_2, \ldots q_L\}.$$

The vectors in the set Q are substantially orthogonal. As defined herein, the vectors in the set Q are substantially orthogonal, if the vectors are orthogonal or quasi-orthogonal to each other. The vectors in the set Q are orthogonal if $$q^C_m \cdot q^C_m = L, \text{ and } q^C_m \cdot q^C_{m'} = 0, \text{ for } m \neq m'.$$

The vectors in the set Q are quasi-orthogonal if $q^C_m \cdot q^C_m = L$, and $q^C_m \cdot q^C_{m'} \ll L$, where L is a constant, and $q^C_m$ and $q^C_{m'}$, are any two vectors in the set Q.

The module 222 maps the spread signal to subcarriers in an N-subcarrier OFDM symbol S 203, $S = F_{map}(D)$, wherein $F_{map}$ is a mapping function. The OFDM symbol of $n^{th}$ subcarrier is $S(n) = d_{m,k}$ 420.

Figure 5:
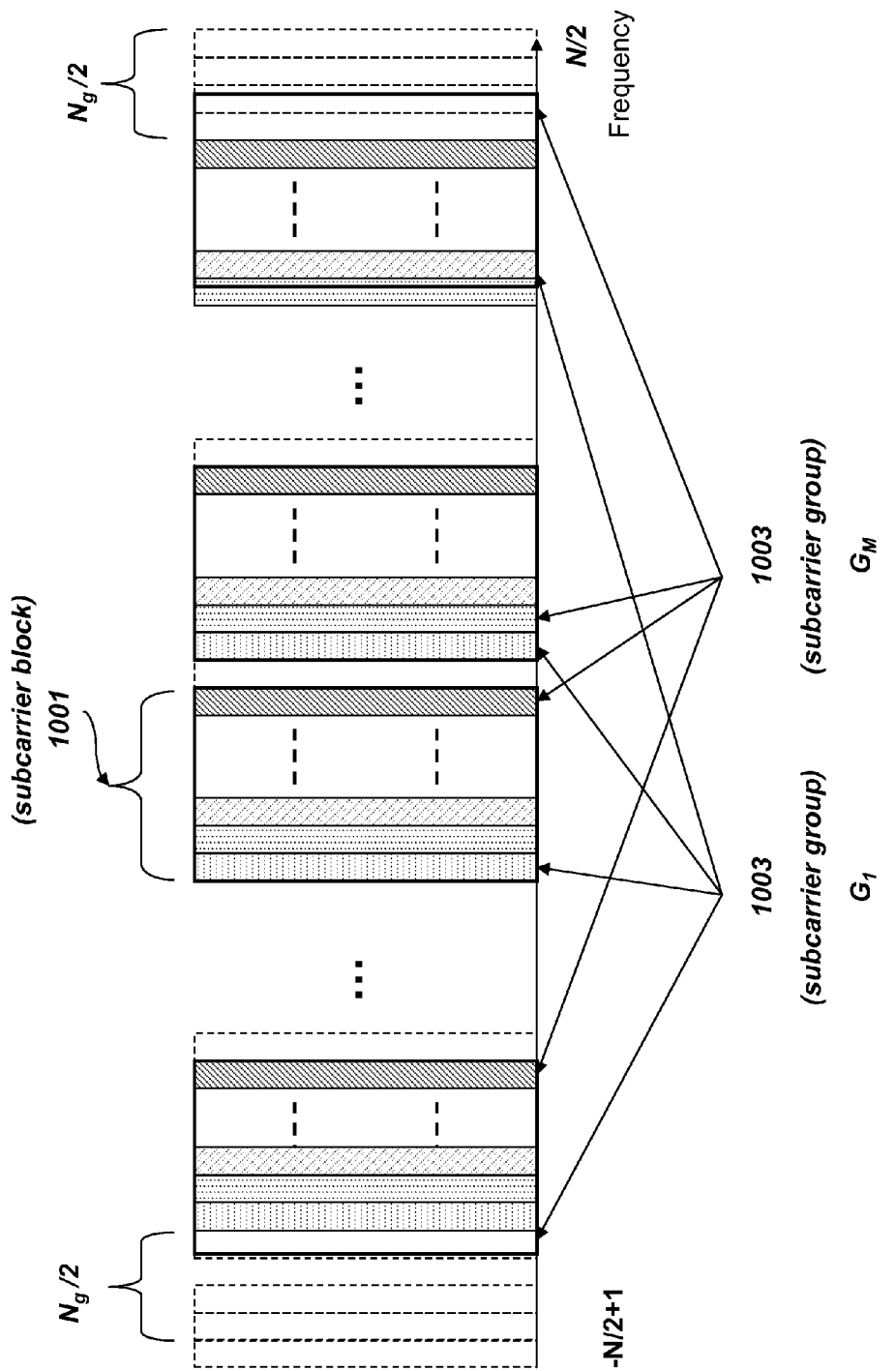
FIG. 5 is a block diagram of subcarrier mapping with frequency redundancy.

FIG. 5 shows the mapping from the K subcarriers to $D^C_m$, which is the $m^{th}$ column vector of the spread signal in the matrix form D, which represents one data element. The K subcarriers are assigned to one subcarrier group $G_m$ 1003. Thus, the elements of the spread signal are mapped to subcarrier groups 1003, such that elements derived from the same data element are mapped to the same subcarrier group.

In one embodiment, the subcarriers within the subcarrier group $G_m$ are evenly spaced, i.e., $S(m+k(M-1)) = S(m+kM) = d_{m,k} = a_m c_{m,k}$, wherein $m+k(M-1)$ is the index of the M-th subcarrier in subcarrier group $G_m$, and $m+kM$ is the index of the (M+1)-th subcarrier in the group, k is a number of subcarriers positioned between these two subcarriers.

The spacing can be achieved, for example, by ordering the elements of the spread signal representing different data elements into one subcarrier block 1001.

Figure 6:
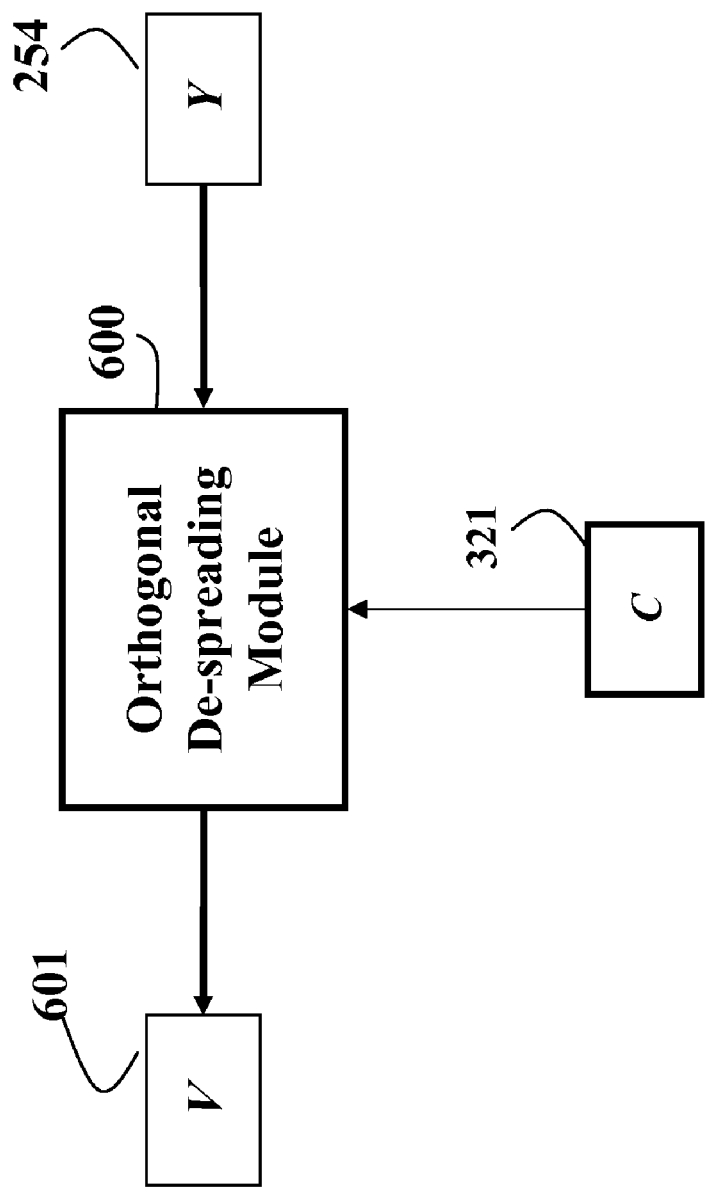
FIG. 6 is a block diagram of a method for receiving a signal while reducing ICI according to embodiments of the invention.

FIG. 6 shows an orthogonal de-spreading module 600, which reverses the operations performed by the spreading module 300. The module 600 receives a de-mapped signal Y 254 from the demapping module 272 and produces de-spread signal V 601 for the combining module 274 using the orthogonal spreading matrix C* 321, i.e., V=Y·C*. Each element in the de-spread signal V can be represented as $$v_{m,k} = y_{m,k} \cdot c^*_{m,k},$$

where operator * is a complex conjugate.

Examples

Figure 7:
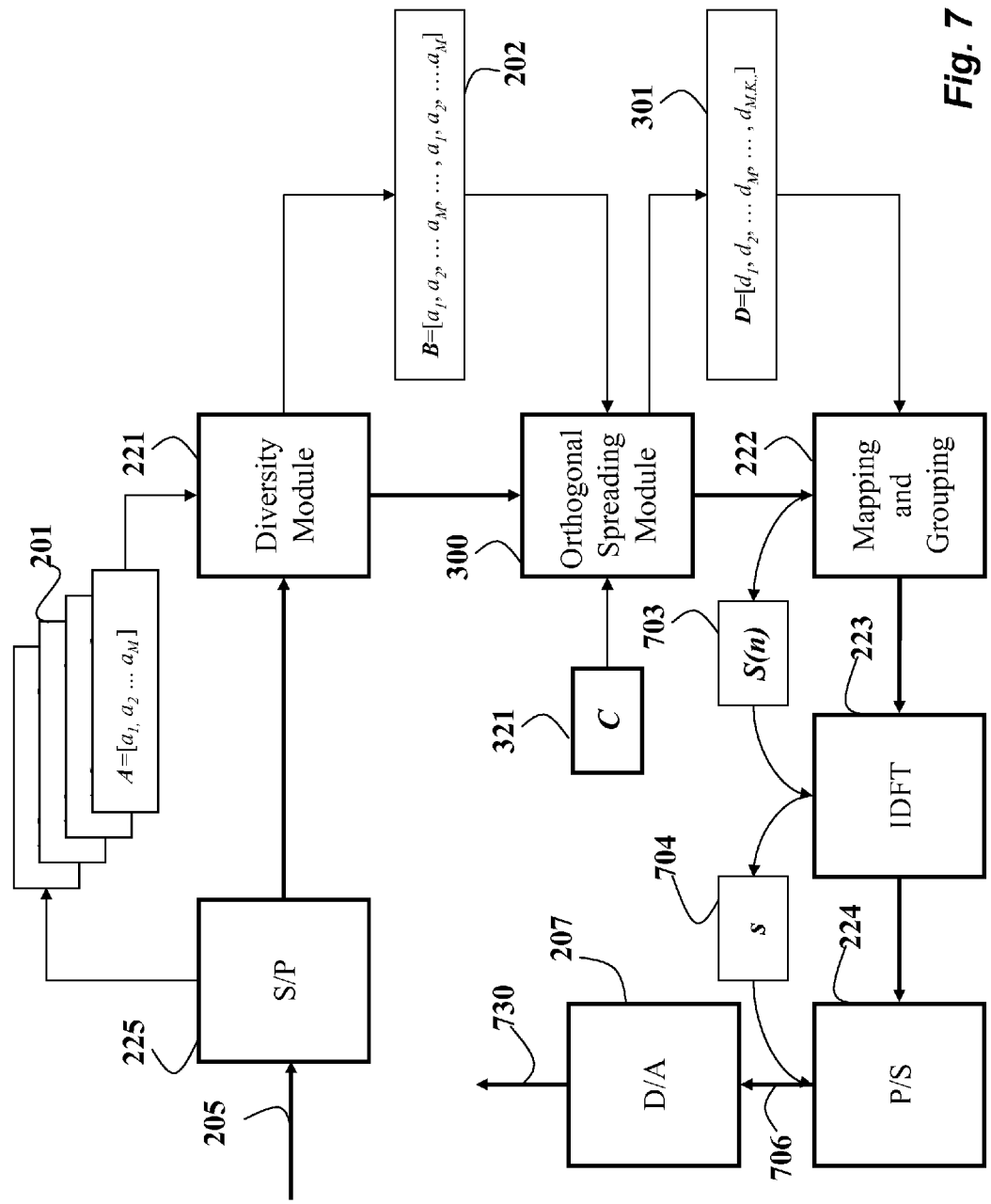
FIG. 7-8 are block diagrams of a method for transmitting and receiving a signal according some embodiments of the invention.

FIG. 7 shows a block diagram of a method and a system for transmitting the signal 205 while reducing inter-carrier interference (ICI) using the transmitter 200 modified with an orthogonal spreading module 300. The signal 205 carries data suitable to be transmitted over orthogonal frequency division multiplexing (OFDM) network. The serial to parallel module 225 partitions the signal into the set of input signals A 201 of length M. Each element $a_m$ is a data element of the signal, typically, a complex number having value determined based on the signal and a modulation format.

The diversity module 221 adds frequency diversity to the signal by duplicating the elements of the input signals for mapping to available subcarriers. For example, the diversity module duplicate the input signal K times producing the diversified signal B 202, i.e., each element $a_m$ in the diversified signal is repeated K times, wherein K is a degree of diversity. For simplicity, only one diversified signal 202 is shown, but it would be readily understood, that the diversity module in effect partitions the signal in a set of diversified signals. The diversified signal includes diversified elements representing the data elements, such that each data element is represented by a number of diversified elements. The number equals the coefficient of diversification.

In one embodiment, the diversified signal 202 is represented as the signal matrix 410, as shown in FIG. 4. A column of the signal matrix is formed by the diversified elements representing one data element, such that each column represents different data elements.

Values of the diversified signal 202 are modified by the orthogonal spreading module 300 based on the orthogonal matrix 321 producing the spread signal 301. The orthogonal spreading module 300 multiplies the diversified signal with the orthogonal matrix C producing the spread signal 301. The spread signal can be written in a matrix form as the matrix D 430 having elements $d_{m,k}$ 420.

The orthogonally spread signal is then mapped 222 to subcarriers in an N-subcarrier OFDM symbol S 703, S=$F_{map}$(D), wherein $F_{map}$ is the mapping function. The OFDM symbol of $n^{th}$ subcarrier is S(n)=$d_{m,k}$. The mapping also inserts pilot tones and guard tones. The OFDM symbol S(n) in frequency domain is then transformed 223 into a OFDM symbol in time domain sequence s 704 using inverse discrete Fourier transformation (IDFT), i.e., s=DFT$^{-1}$(S(n)). The OFDM symbol in time domain is then converted 224 to a sequential signal s(t) 706 with attached cyclic prefix or zero-padding. The sequential signal is up-converted 207 to a radio frequency (RF) signal 730 and transmitted over the channel 299.

Figure 8:
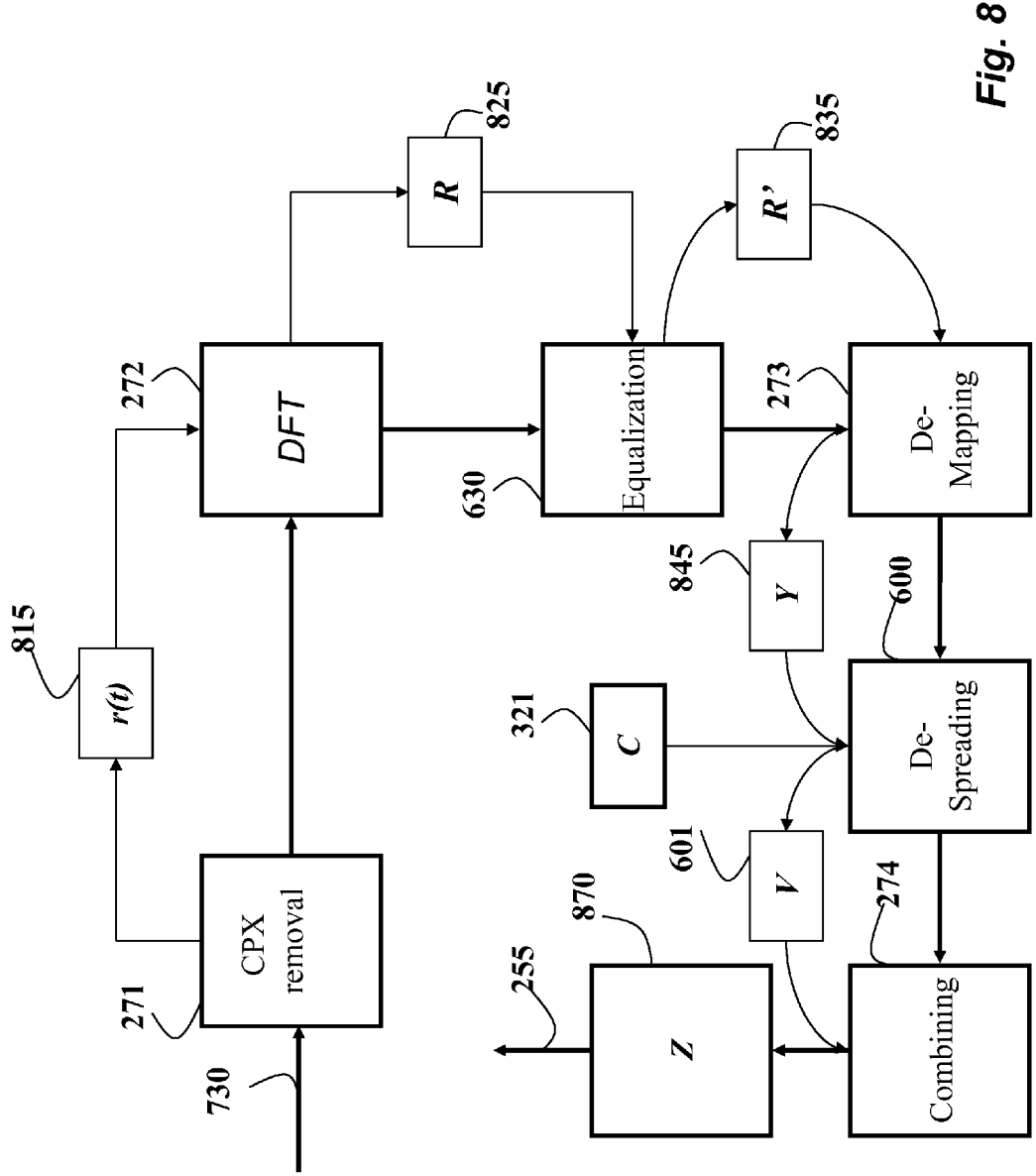

FIG. 8 shows a block diagram of a method and a system for receiving the signal 730. After the removal 271 of the cyclic prefix, the signal r(t) 815 is converted 272 to a frequency domain symbol R=DFT(r) 825. In some embodiments, frequency domain equalization 630 is performed to produce a symbol R'=EQ(R) 835.

The de-mapping module 273 reverses the mapping operation producing a de-mapped signal Y 845, i.e., Y=$F_{map}^{-1}$(R'), wherein $F_{map}^{-1}$ is the de-mapping operation. Next, the method 600 de-spreads the de-mapped signal Y with the same orthogonal spreading matrix C 321 producing a de-spread signal V 601.

Elements of the de-spread signal V is then combined 274 to generate the output symbol Z=[$z_1$ $z_2$ ... $z_M$] 255. The combining operation is $$z_m = \sum_{k=1}^{K} g_{m,k} v_{m,k},$$

where $g_{m,k}$ are combining coefficients having values define the combining scheme. For example, $g_{m,k}=g=1/K$ when equal weight combining (EWC) is used, $g_{m,k}=|h_{m,k}|^2$ for maximum ration combing (MRC). The combined output symbol Z is then processed 880 by subsequent functional blocks.

Figure 9:
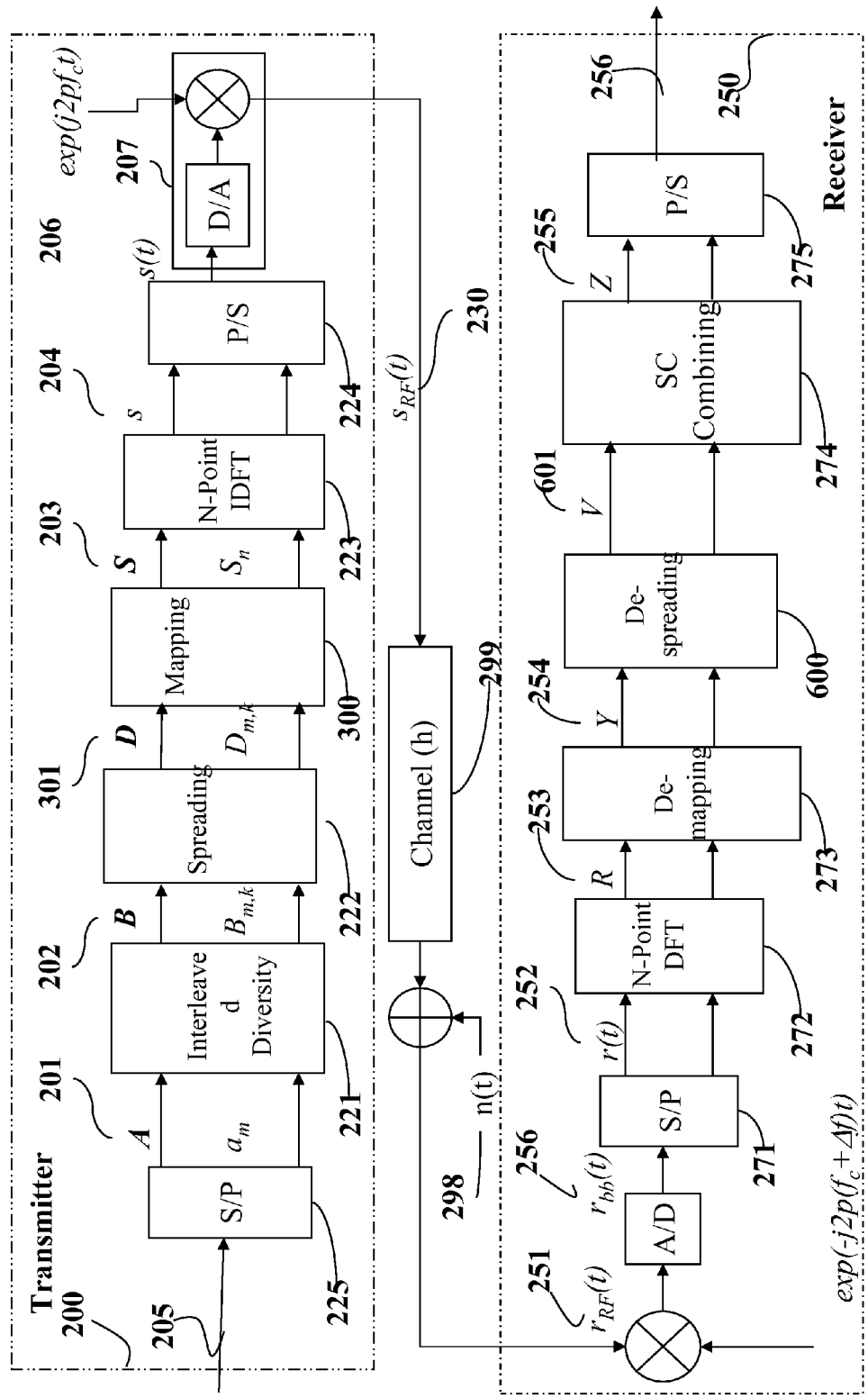
FIG. 9 is a block diagram of an example of the OFDM transmitter and receiver having subcarrier spreading and de-spreading modules.

FIG. 9 shows a block diagram of an example of the OFDM transmitter and receiver having subcarrier spreading 300 and de-spreading 600 modules.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for reducing inter-carrier interference (ICI) in a network, wherein the network uses orthogonal frequency division multiplexing (OFDM), comprising a processor for performing steps of the method, comprising the steps of:
    generating, in a transmitter, a diversified signal B of M data elements repeated K times;
    multiplying, in the transmitter, the diversified signal B by an orthogonal matrix C according to B·C to produce a spread signal D suitable for transmission in the network at a reduced ICI, wherein the orthogonal matrix is a M×K matrix, and M columns in the orthogonal matrix correspond to K vectors {$q_1$, $q_2$, $q_K$}, wherein the K vectors are substantially orthogonal, where M and K are integers greater than zero, and $$C^c_m \epsilon Q = \{q_1, q_2, \ldots q_L\}; \text{ and}$$

transmitting the spread signal D in the network.
2. The method of claim 1, wherein the K vectors are orthogonal to each other.
3. The method of claim 1, wherein the K vectors are quasi-orthogonal to each other.
4. The method of claim 1, further comprising:
    mapping the spread signal D to subcarriers in an N-subcarrier OFDM symbol S, S=$F_{map}$(D), wherein $F_{map}$ is a mapping function.
5. The method of claim 4, the mapping further comprising:
    mapping elements deriving from a data element to a subcarrier group.
6. The method of claim 4, the mapping further comprising:
    mapping elements deriving from different data elements to a subcarrier block.
7. The method of claim 1, further comprising:
    de-spreading, in a receiver, the spread signal, based on the orthogonal matrix C.

8. The method of claim 1, further comprising:
  demapping, in a receiver, the spread signal to produce a de-mapped signal Y; and
  de-spreading, in a receiver, the de-mapped signal Y, based on the orthogonal matrix C to produce a de-spread signal V according to V=Y·C*, wherein operator * is a complex conjugate.

9. A method for reducing inter-carrier interference (ICI) in a network, wherein the network uses orthogonal frequency division multiplexing (OFDM), comprising a processor for performing steps of the method, comprising the steps of:
  generating, in a transmitter, a diversified signal, wherein the diversified signal, includes diversified elements representing data elements, such that each data element is represented by a number of diversified elements, wherein the number equals a degree of diversity;
  modifying the diversified signal based on an orthogonal matrix producing a spread signal, wherein columns of the orthogonal matrix are formed by vectors, wherein the vectors are orthogonal or quasi-orthogonal to each other; and
  transmitting the spread signal in the network.

10. The method of claim 9, the modifying further comprising:
  representing the diversified signal as a signal matrix, wherein a column of the signal matrix is formed by the diversified elements representing one data element, such that each column represents different data elements; and
  multiplying the signal matrix by the orthogonal matrix producing spread matrix, wherein elements of the spread matrix represents the orthogonally spread signal.

11. The method of claim 9, further comprising:
  mapping elements of the spread signal to subcarrier groups, such that elements derived from the same data element belong to the same subcarrier group.

12. The method of claim 11, wherein a number of subcarriers in the subcarrier group equals a number of the elements derived from the same data element.

13. A system for reducing inter-carrier interference (ICI) in a network, wherein the network uses orthogonal frequency division multiplexing (OFDM), comprising:
  an interleaved diversity module configured for generating a diversified signal B of M data elements repeated K times;
  an orthogonal spreading module configured for multiplying, in the transmitter, a diversified signal B by an orthogonal matrix C according to B·C to produce a spread signal D suitable for transmission in the network at a reduced ICI, wherein the orthogonal matrix is a M×K matrix, and M columns in the orthogonal matrix correspond to K vectors $\{q_1, q_2, \ldots q_K\}$, wherein the K vectors are orthogonal, wherein the K vectors are substantially orthogonal, where M and K are integers greater than zero, and $C^c_m \epsilon Q = \{q_1, q_2, \ldots q_L\}$; and
  a transmitting module configured for transmitting the spread signal D in the network.

14. The system of claim 13, further comprising:
  mapping module configured for mapping the spread signal D to subcarriers in an N-subcarrier OFDM symbol S, $S=F_{map}(D)$, wherein $F_{map}$ is a mapping function.

15. The system of claim 14, wherein the mapping module is configured to map elements deriving from a data element to a subcarrier group.

16. The system of claim 14, wherein the mapping module is configured to map elements deriving from different data elements to a subcarrier block.

17. The system of claim 13, further comprising:
  de-spreading module configured to de-spread the spread signal based on the orthogonal matrix.

* * * * *